US009751072B2

(12) United States Patent
Jarlsjo et al.

(10) Patent No.: US 9,751,072 B2
(45) Date of Patent: Sep. 5, 2017

(54) TREATMENT OF HEAVY CRUDE OIL AND DILUENT

(71) Applicant: Quanta Associates, L.P., Houston, TX (US)

(72) Inventors: Bengt Arne Jarlsjo, Houston, TX (US); Thomas Gieskes, Houston, TX (US); Joe Travis Moore, Tulsa, OK (US); Lance Dawson McCarver, Tulsa, OK (US)

(73) Assignee: Quanta, Associates, L.P., Houston, TX (US)

( * ) Notice: Subject to any disclaimer, the term of this patent is extended or adjusted under 35 U.S.C. 154(b) by 209 days.

(21) Appl. No.: 14/659,938

(22) Filed: Mar. 17, 2015

(65) Prior Publication Data

US 2015/0267128 A1    Sep. 24, 2015

Related U.S. Application Data

(60) Provisional application No. 61/954,706, filed on Mar. 18, 2014.

(51) Int. Cl.
| | |
|---|---|
| *C10G 45/02* | (2006.01) |
| *B01J 19/24* | (2006.01) |
| *C10G 1/00* | (2006.01) |
| *C10G 1/02* | (2006.01) |
| *B01J 8/02* | (2006.01) |

(52) U.S. Cl.
CPC .............. *B01J 19/24* (2013.01); *B01J 8/02* (2013.01); *C10G 1/002* (2013.01); *C10G 1/02* (2013.01); *C10G 45/02* (2013.01); *B01J 2208/00176* (2013.01); *B01J 2219/0004* (2013.01); *B01J 2219/00006* (2013.01); *B01J 2219/00038* (2013.01); *B01J 2219/00103* (2013.01); *B01J 2219/00159* (2013.01); *B01J 2219/00182* (2013.01); *C10G 2300/202* (2013.01)

(58) Field of Classification Search
CPC .... B01J 19/24; B01J 8/02; B01J 2219/00182; B01J 2219/00159; B01J 2208/00176; B01J 2219/00006; B01J 2219/00038; B01J 2219/0004; B01J 2219/00103; C10G 45/02; C10G 1/002; C10G 1/02; C10G 2300/202
See application file for complete search history.

(56) References Cited

U.S. PATENT DOCUMENTS

| | | |
|---|---|---|
| 5,820,750 A | 10/1998 | Blum et al. |
| 5,976,360 A | 11/1999 | Blum et al. |

(Continued)

FOREIGN PATENT DOCUMENTS

WO    2008124912 A1    10/2008

OTHER PUBLICATIONS

PCT International Search Report dated May 29, 2015 issued in PCT/US2015/020980 (4 pages).

*Primary Examiner* — Randy Boyer
*Assistant Examiner* — Juan Valencia
(74) *Attorney, Agent, or Firm* — Trop Pruner & Hu, P.C.

(57) ABSTRACT

An integrated process simultaneously removes the diluent and reduces the TAN, resulting in cost savings from the diluent recovery and increasing the value of the produced heavy crude stream by removing the acids and other contaminants, while reducing the overall energy requirements when compared to performing the two processes separately.

11 Claims, 6 Drawing Sheets

(56) References Cited

U.S. PATENT DOCUMENTS

| | | | |
|---|---|---|---|
| 6,086,751 A * | 7/2000 | Bienstock | C10G 31/06 208/263 |
| 2006/0283776 A1 | 12/2006 | Iqbal et al. | |
| 2007/0274901 A1 * | 11/2007 | Wolf | B01J 8/0453 423/502 |
| 2010/0206772 A1 | 8/2010 | Keppers | |
| 2013/0111807 A1 * | 5/2013 | Bathurst | C10G 1/02 44/457 |

* cited by examiner

TREATMENT OF HEAVY CRUDE OIL AND DILUENT

CROSS-REFERENCE TO RELATED APPLICATIONS

This application is a non-provisional application claiming priority to provisional application Ser. No. 61/954,706, filed on Mar. 18, 2014, hereby expressly incorporated by reference herein.

BACKGROUND

This relates to the simultaneous removal of naphthenic acids and the recovery of diluents from heavy crude oil streams that were blended with diluents for transportation or extraction and production purposes.

When a heavy bituminous crude oil is produced, i.e., a crude oil with an American Petroleum Institute (API) gravity of less than 20 0 API, but more specifically bituminous crude oils in the range of 8 to 12 0 API, it requires blending with a diluent in order to reduce the viscosity to a point that allows transportation by pipeline at ambient temperatures. Often transport by pipeline is only required for a relatively short distance from the producing area, such as is the case for instance for Canadian bitumen transported on gathering pipelines to a nearby railcar loading terminal, or a Colombian heavy crude transported to a port from which it can be exported by ship. From these locations, the heavy crude oil can be transported to its final destination in undiluted or only lightly diluted form by using insulated railcars or ships with reheating capabilities. It will almost always be cost advantageous to remove the diluent in the rail terminal or loading port for reuse in the producing region. Recovering the diluent reduces the volume of product to be transported to the final destination, and usually the diluent has a higher value in the producing region than it has in the markets to which the heavy crude oil is shipped.

Other applications include delivery of the blend of bituminous heavy crude and diluent by long distance pipeline to a refinery that is not well equipped to handle acidic feeds and/or would prefer to remove the light hydrocarbons used as diluent in order not to burden its atmospheric distillation column. In many refineries, once the light hydrocarbon diluent is removed, the bitumen can be directly fed to specialized units designed for upgrading of very heavy fractions, such as cokers or crackers, bypassing the atmospheric and vacuum distillation steps.

The diluent, which typically consists of light hydrocarbons of which pentanes, hexanes and heptanes make up the majority, can be separated from the heavy crude oil by boil-off or simple distillation because of the wide difference in boiling range between the diluent and the heavy bituminous crude oil. The methods to do so are well understood by those skilled in the art, and the installations used for this purpose are known in the industry as Diluent Recovery Units, or DRUs.

Heavy, bituminous crude oils that are likely to be processed in DRUs are often high in naphthenic acids, sulfur, and other contaminants that make the crude oil more difficult to process and cause these crudes to trade at significant discounts to lighter, sweeter crudes. The acidity of crude oils is usually expressed in milligrams of potassium hydroxide needed to neutralize one gram of oil (mg KOH/g), and referred to in the industry as the Total Acid Number (TAN). Crude oils with a TAN of more than 1.0 mg KOH/g are considered problematic in most refineries, and will require special metallurgy, dilution with crude oil with low acidity, or the use of corrosion inhibitors. Many technologies are known to reduce the acidity of crude oils using a wide array of processes, such as destruction through thermal and/or catalytic conversion, adsorption, or extraction. For instance, U.S. Pat. No. 5,820,750A teaches the thermal decomposition of acids whereby the decomposition products such as carbon monoxide, carbon dioxide and water, are continuously removed by a gas sweep.

BRIEF DESCRIPTION OF THE DRAWINGS

Some embodiments are described with respect to the following figures.

DETAILED DESCRIPTION

Figure 1:
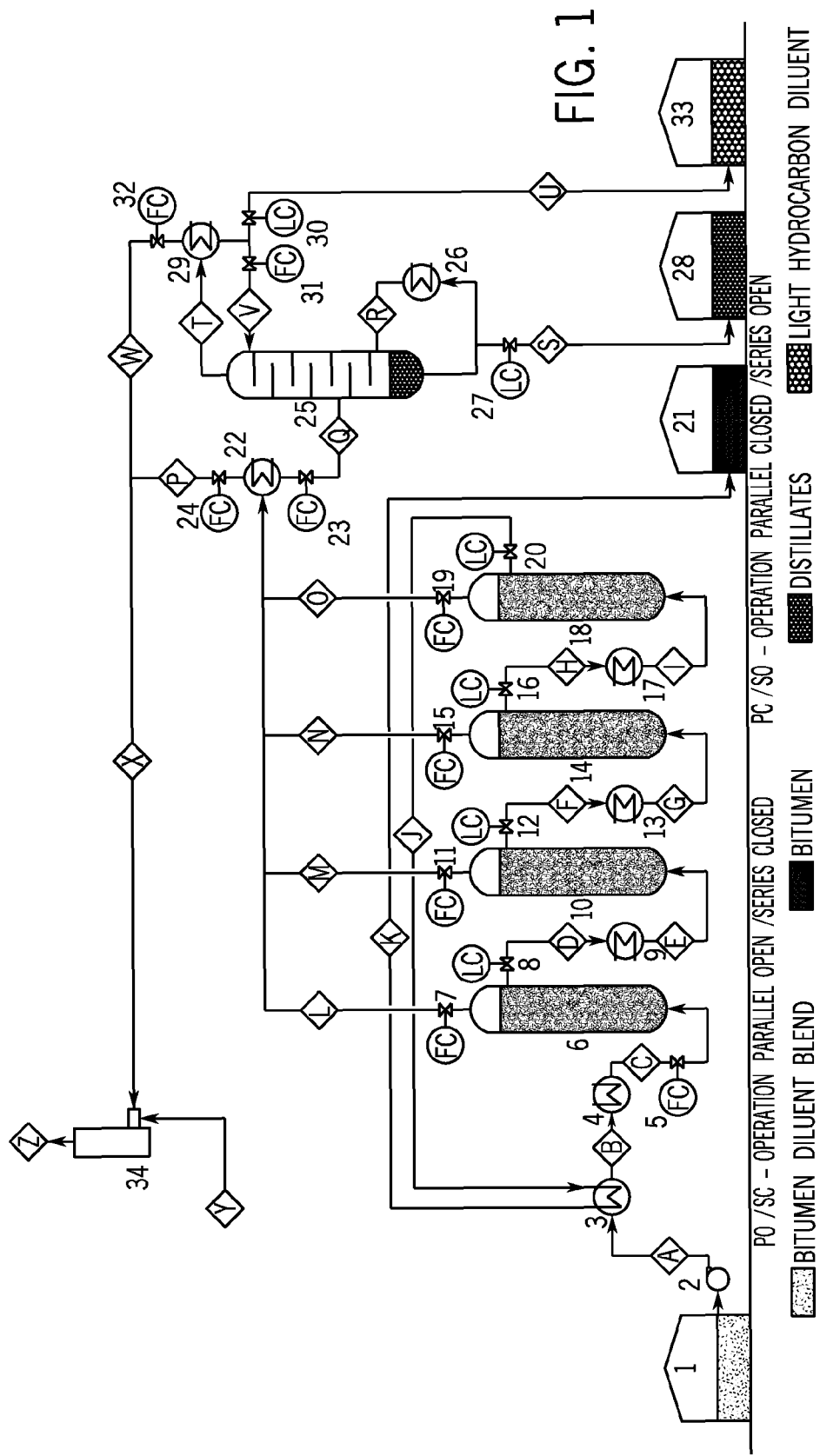
FIG. 1 is a schematic depiction of an embodiment using four reactor-stills, various heat exchange equipment and one conventional distillation column.

An integrated process simultaneously removes the diluent and reduces the TAN, resulting in cost savings from the diluent recovery and increasing the value of the produced heavy crude stream by removing the acids and other contaminants, while reducing the overall energy requirements when compared to performing the two processes separately. Diluents, naphthenic acids and other contaminants may be simultaneously removed from bituminous heavy crude oil that was previously blended with light hydrocarbon diluents in order to be able to flow at ambient temperatures or for extraction/production purposes. Diluent vapors may be used as a stripping gas to remove products of a decomposition reaction. The diluent removal is done at a sufficiently elevated temperature with a residence time that removes acid concurrently with the diluent.

In one embodiment, the heavy oil and diluent blend, which contains typically 70% heavy crude oil and 30% diluent, is pumped up to pressures ranging from 800 to 3,200 kPa (116 to 464 psia) and heated to a temperature that can range from 250 to 500 °C. (480 to 930 °F.), but preferably around 400 °C. (750 °F.). The mixture of diluent and bituminous crude oil is then fed to a series of reactor-stills, the number of which can range from one to many, with 3 to 6 representing for most blends an optimum between operational efficiency and equipment costs. In the reactor-stills, sufficient residence time is created to allow the substantial completion of the thermal decomposition reaction of the naphthenic acids, which may require anywhere from 10 minutes to several hours, depending on the selected temperature and the acid content of the crude oil. At 400 °C. (750 °F.), for crude oils with TAN numbers ranging from 2 to 6 mg KOH/g, preferably at least one hour of residence time is provided to achieve a reduction in TAN of 75% or more.

By lowering the pressure in each successive reactor-still and reheating the effluent stream from one reactor-still before feeding it to the next reactor-still, the diluent is distilled off and acts as a sweep to remove the products from the thermal decomposition reaction of the acids, consisting primarily of carbon monoxide (CO), carbon dioxide (CO2) and water (H2O). To achieve the required sweep, vapor hold-up should be in a range of 10 to 40%, preferably around 25%. By regulating the flow rate of the gas vented from the reaction-still, the vapor sweep rate and vapor hold-up in the reactor-still can be controlled. Since the temperature is determined by the requirements for thermal decomposition of the acids, controlling the vented gas flow means that the pressure in the reactor finds its own equilibrium, corresponding to the vapor pressure of the liquid at the given temperature and liquid composition.

Although in principle it would be possible to create counter-current flow in the reactor-stills, whereby the mixture of crude and diluent is introduced at the top and taken out from the bottom, with vapor vented from the top, one embodiment uses a concurrent vertical flow, whereby both the volume of the vapor generated by boil off and the production of decomposition reaction products increase as both streams flow upwards. In theory, horizontal reactor-stills can also be used, whereby vapor is generated all along a long, partially liquid filled reactor-still and vapor is collected from the top. However, with the vertical concurrent flow model, the boil off vapors bubble through the liquid with sufficient residence time to allow the mass transfer of decomposition products into the vapor phase.

As an alternative to reheating between stages, it is also possible to apply continuous heat to each reactor-still by means of external jacketing, shell and tubes arrangements or internal coils through which a suitable heating fluid such as steam or thermal oil flows. If necessary, such forms of heat supply can also be used in combination with reheating between stages.

The diluent vapors that contain the removed decomposition products are condensed by cooling, whereby the decomposition products are vented as incondensable gases. Since this stream will contain trace concentrations of light hydrocarbons and potentially hazardous concentrations of carbon monoxide, it will be necessary to subject the non-condensable vent gases to environmental control measures, such as thermal combustion.

Because of the high temperatures used for the thermal decomposition of the acids, the distillation process also removes some heavier components from the bituminous crude oil. Typically around half of the hydrocarbons that are present in the bituminous crude oil that have an atmospheric boiling point in the distillate boiling range, i.e., with an atmospheric boiling point between 160 and 420 °C. (320 to 790 °F.), will end up in the vapor phase along with the diluent. This distillate stream will often have a higher value as a diesel blendstock or heating oil than as either diluent or as a fraction of the bituminous crude oil, and therefore one of the secondary benefits of some embodiments is that this by-product distillate stream, which can easily be separated from the lighter diluent components by distillation, can be sold separately, for example as heating oil.

Figure 2:
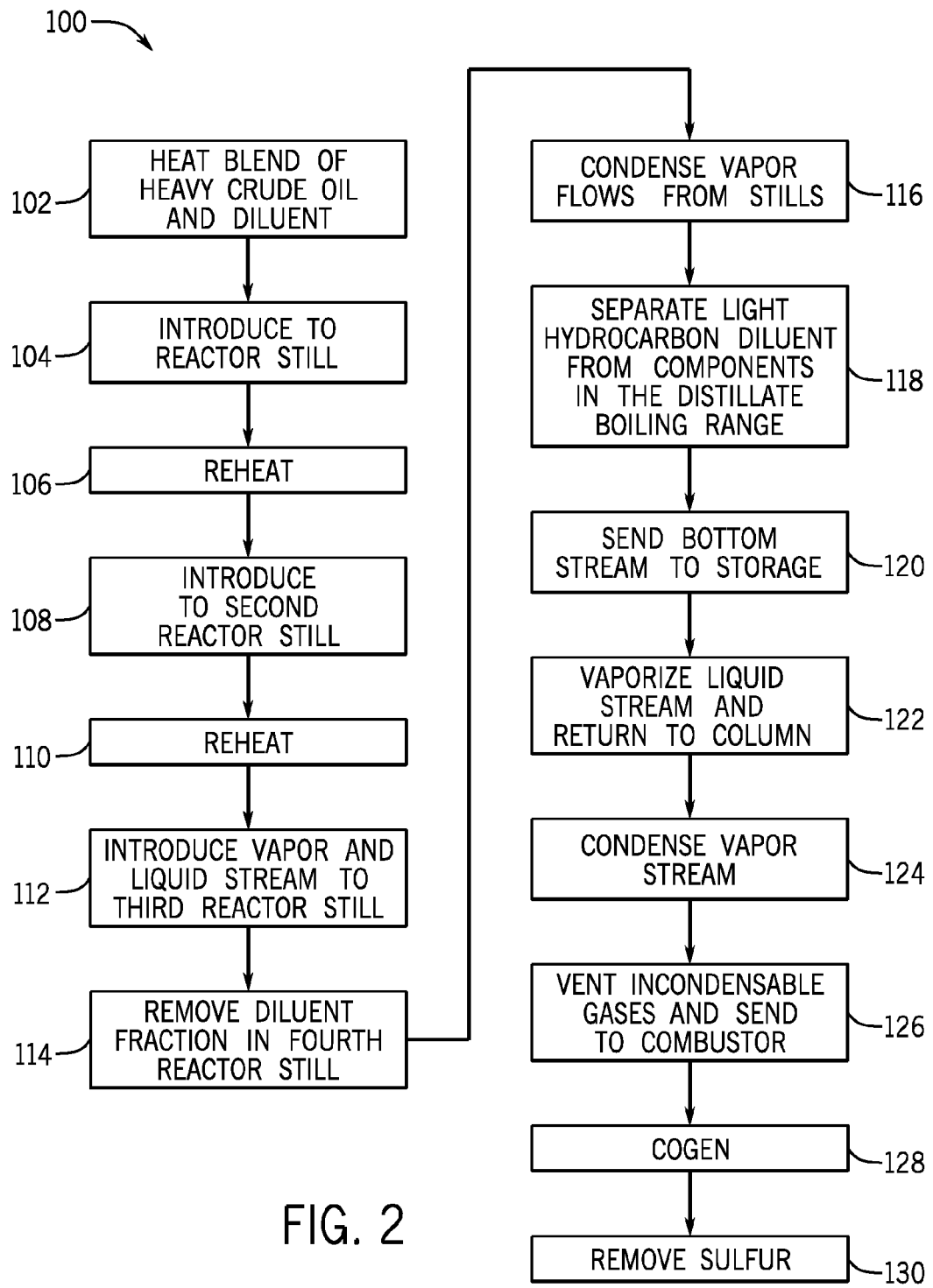
FIG. 2 is a flow chart for one embodiment.

A blend of heavy crude oil and diluent labeled A in FIG. 1 may be transferred from storage tank 1 by pump 2 to a feed-effluent heat exchanger 3 where the heavy crude oil and diluent blend is heated up by recovering heat from the finished product bituminous crude oil stream J, as shown at block 102 in FIG. 2. The feed stream B may be further heated up in heat exchanger 4, which may, as examples, be a direct-fired furnace, or a heat exchanger applying heat from a suitable medium such as steam or thermal oil. The heated feed stream C is introduced into the first reactor-still 6 via flow control valve 5, as shown at block 104 in FIG. 2.

The amount of heat introduced in heater 4 can be controlled such that the desired temperature is reached in the bottom of the first reactor-still 6. The elevated temperatures created by heater 4 will cause some of the diluent to evaporate.

The amount of vapor generated is controlled by flow control valve 7. Increasing the amount of vapors allowed to leave the reactor-still will lower the pressure and therefore increase the amount of vapor generated under near adiabatic conditions in the reactor-still, while decreasing the amount of flow will increase the pressure and have the opposite effect.

A constant level may be maintained by level control valve 8, which regulates the effluent stream D from the first reactor-still 6. Stream D is reheated (FIG. 2, block 106) in heat exchanger 9 to the desired temperature for the second reactor-still 10 (FIG. 2, block 108), whereby the reheated stream E will contain a certain amount of light hydrocarbon vapors that are controlled by vapor flow control valve 11 and level is maintained by control valve 12. Overflow F is reheated (FIG. 2, block 110) in exchanger 13 and the vapor and liquid stream G is fed to the third reactor-still 14 (FIG. 2, block 112), where the same process is repeated under control by valves 15 and 16.

The final light hydrocarbon diluent fractions still present in effluent H evaporate after reheating in heater 17 and are removed from feed I in the fourth reactor-still 18 (FIG. 2, block 114). The effluent stream J leaving reactor-still 18 is regulated by flow control valve 20, and typically will contain less than 1% diluent. This almost pure bitumen stream will enter feed-effluent exchanger 3 where it will heat up the fresh feed stream A. After being cooled down to a temperature of 70 to 120 °C. (160 to 250 °F.), the bitumen stream K is run down to a storage tank 21.

The vapor flows L, M, N, and O are led to a condenser 22 (FIG. 2, block 116) from which the condensed liquids are fed via a level control valve 23 to a distillation column 25, in which the light hydrocarbon diluent components are separated from components in the distillate boiling range (FIG. 2, block 118). The bottom stream S is send to a storage tank 28 (FIG. 2, block 120) via level control valve 27, while a portion of the liquid stream is vaporized in a reboiler 26 (FIG. 2, block 122) and returned as a vapor stream R to column 25.

The vapor stream T from the top of the column is condensed in condenser 29 (FIG. 2, block 124), from which the condensed liquid stream U, consisting of light hydrocarbon diluent, is transferred to a storage tank 33 via a level control valve 30. A portion of the condensed liquids is returned to column 25 via flow control valve 31 as reflux stream V.

The incondensable gases W from condenser 29 may be vented via pressure control valve 32 (FIG. 2, block 126), and combined with the incondensable gases P that are vented via pressure control valve 24 from condenser 22. The combined vent gas stream X, which consists of the decomposition products of the naphthenic acids, primarily CO, CO2 and H2O, as well as light hydrocarbons, is fed to a thermal combustor 34, where combustible components are thermally oxidized with the aid of a suitable supporting fuel Y, preferably natural gas, in the presence of air. The flue gas Z is vented to the atmosphere and may require additional environmental controls, depending on local regulations.

The temperatures and residence times may be chosen, in another embodiment, such that not all diluent is removed, while still achieving significant reduction in TAN. By operating at higher pressures and lower flow rates, while maintaining temperatures at levels that are sufficient for decomposition of naphthenic acids, some diluent can be left in the bituminous crude, i.e., up to 20%. Removing only the minimum amount of diluent required to act as sweep gas for the removal of acid will increase the range of transport options available. For instance, at 5 to 10% diluent the blend will be too viscous to travel on pipelines, but could be transported more easily on railcars and ships with limited insulation and reheating capabilities.

Figure 3:
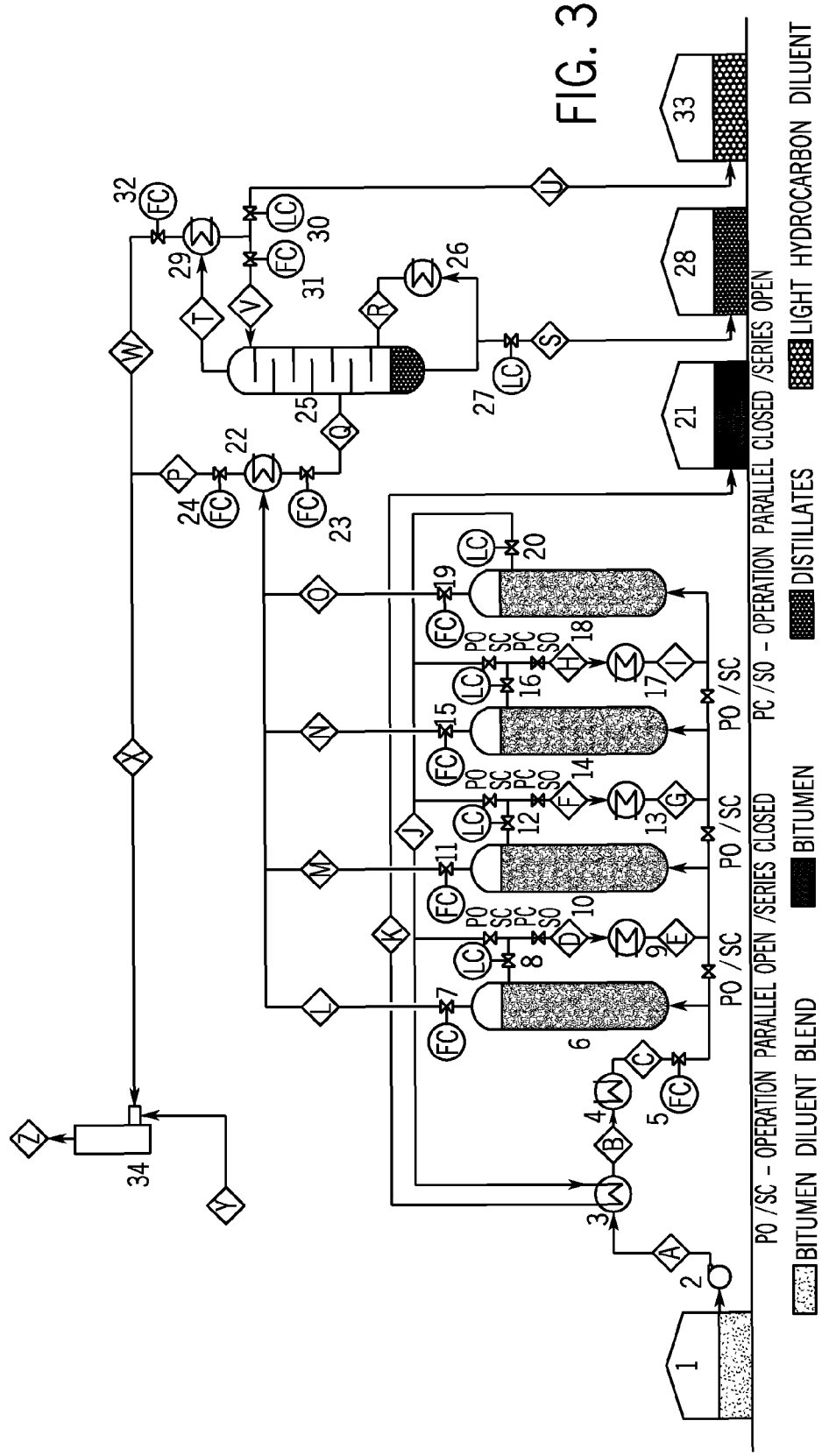
FIG. 3 is a schematic depiction of an embodiment in which reactors operate in parallel.

According to an embodiment wherein the reactors operate in parallel, shown in FIG. 3, valves and piping are added to allow the reactors 6, 10, 14 and 18 to operate in parallel when the residence time is lower or when vessels are sufficiently large to allow residence time. Specifically, valves labelled parallel open (PO) series closed (SC) and parallel closed (PC) series open (SO) may be operated so that the reactors may selectively operate in parallel or in series. This feature is also used when treating feedstock for diluent recovery only. The same equipment and operations, shown in FIG. 1, may be used.

Figure 4:
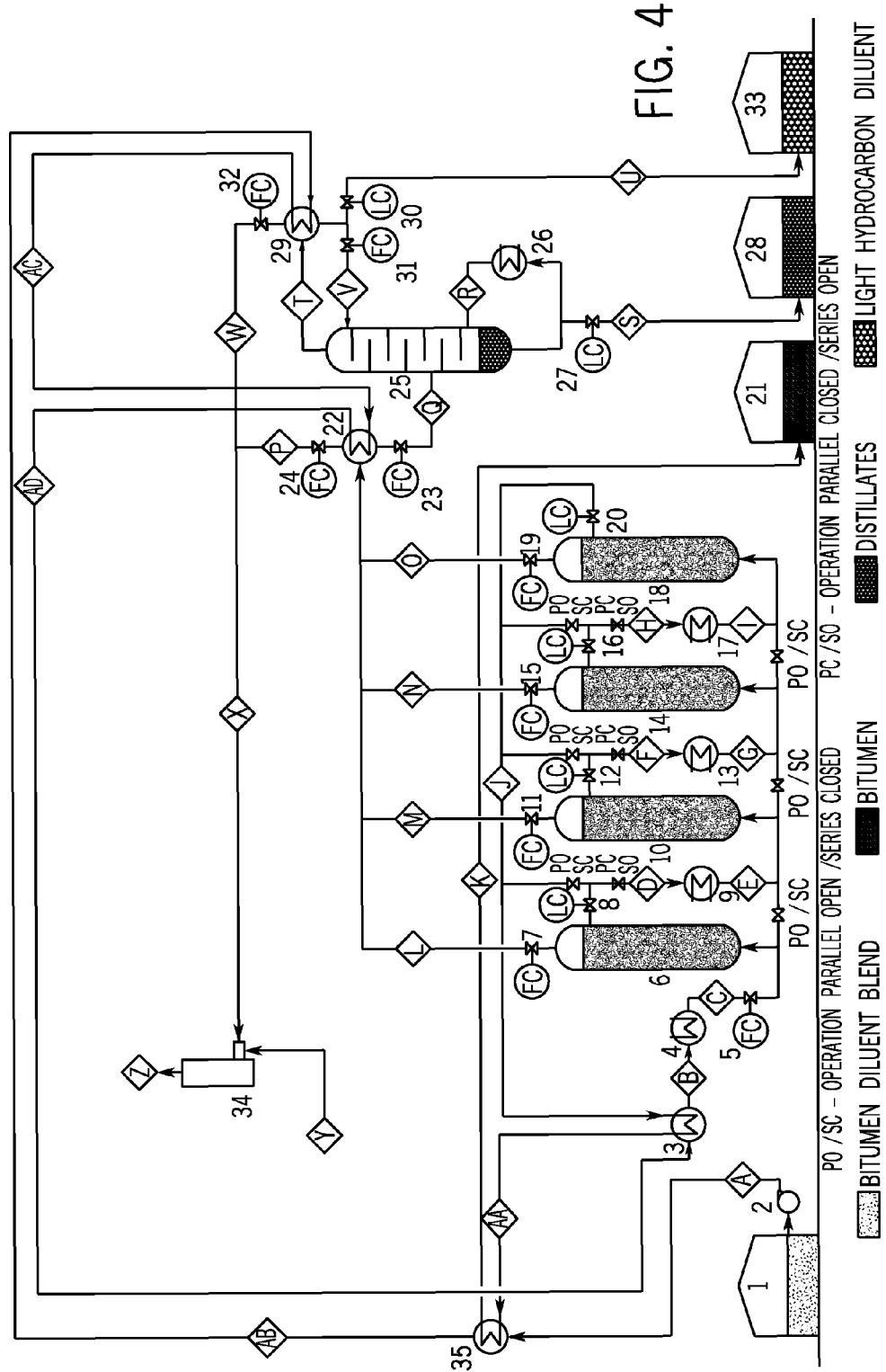
FIG. 4 is a schematic depiction of a heat recovery embodiment.

In accordance with another embodiment, shown in FIG. 4, heat recovery systems are integrated into the process to reduce the total heat requirement by as much as 75%. The systems may include shell and tube or other design heat exchangers to recover heat from the treated stream. The resulting heat required would be that required to make up losses and the difference between the incoming temperature and the final temperature of the bitumen or other treated feedstock. If required, heat recovery could be enhanced by the addition of vapor compression systems and other heat pump technologies.

Heat may be recovered, according to one embodiment shown in FIG. 4. Heat exchanger 35 and piping is added to the embodiment shown in FIG. 3 to implement step 102 of FIG. 2, to further recover heat from the treated liquid and vapor streams improving the overall economics of the system. Feed stream A is redirected to heat exchanger 35. Medium hot bitumen stream AA is directed to heat exchanger 35, preheating stream A before returning as cooled bitumen stream K. Warm feed stream AB is directed to heat exchanger 29 where it is further heated by vapor stream T. Medium hot feed AC is directed to heat exchanger 22 where it is further heated by vapor streams L, M, N and O. Hot feed stream AD is directed to heat exchanger 3 where it is further heated by hot treated bitumen stream J. Additional methods of heat recovery such as vapor compression and heat pump technology may also be added to the system.

Figure 5:
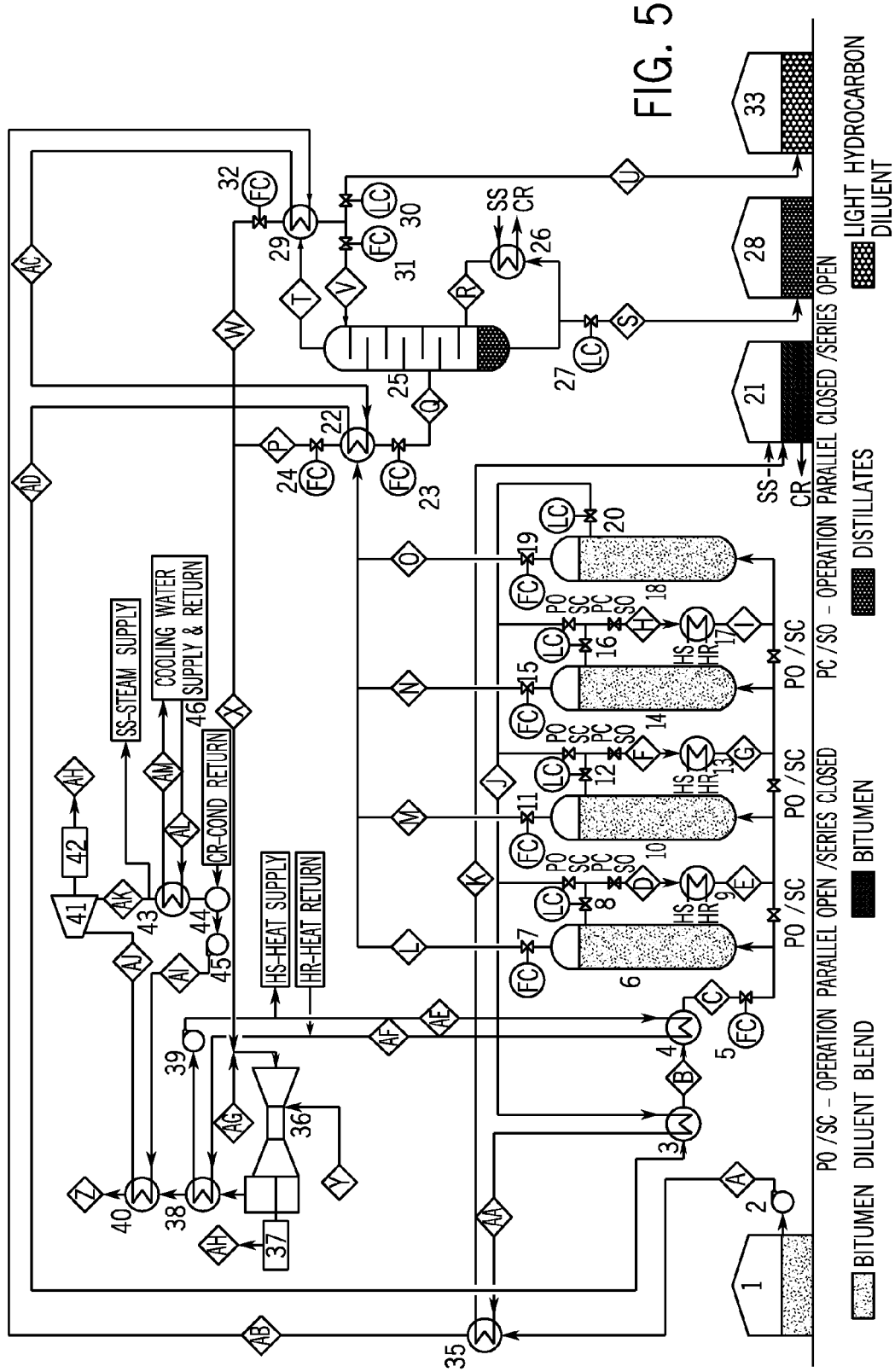
FIG. 5 is a schematic depiction of a Cogen embodiment.

In accordance with still another embodiment, shown in FIG. 5, an electrical cogeneration (Cogen) plant is used in the process, thereby reducing the overall operational costs through the use of waste heat. The cogen plant may be sized to balance the DRU-TAN heat requirements with the area electrical demand. A 100,000 barrel per day DRU-TAN reduction system could be coupled with a 70-megawatt cogen power plant, with the waste heat supplying the approximate 160 mmbtu/hour DRU-TAN heat requirement. The 70-megawatts of power would provide power for the process with the excess being sold to the grid or other power users in the area.

FIG. 5 shows an embodiment for cogeneration, as also indicated at block 128 in FIG. 2. A cogeneration system may be added to the process, shown in FIG. 3, to further improve overall economics. A gas turbine 36, electric generator 37, hot oil heat exchanger 38, hot oil pump 39, steam boiler 40, steam turbine 41, electric generator 42, steam condenser 43, condensate tank 44, feed water pump 45 and associated piping and systems make up the cogeneration system. Air AG, contaminant vapors X and suitable fuel Y is fed into gas turbine 36 driving electrical generator 37 producing electricity AH and exhaust gas Z. The hot exhaust is used to supply heat to the hot oil heat exchanger 38 and produce steam in the steam boiler 40. The hot oil supply AE, also shown as (HS), from hot oil pump 39 is conveyed to heat exchangers 4, 9, 13 and 17. The hot oil return AF, also shown as (HR) is returned to heat exchanger 38. High pressure steam AJ is conveyed to the steam turbine 41 which drives generator 42, producing electricity AH. Low Pressure Steam AK, also shown as steam supply (SS), is conveyed to the steam supply system for use as heat source for tank 21 and heat exchanger 26. Condensate return (CR) from condenser 43, tank 21 and heat exchanger 26 is returned to condensate tank 44. Feed water pump 45 receives condensate from condensate tank 44 and conveys feed water Al back to steam boiler 40. A cooling water system 46 supplies cooling water AL from cooling tower or other source to absorb heat in condenser 43 and is returned as cooling water return AM. Energy usage and heat recovery may be optimized to make the system more cost effective.

The DRU-TAN Reduction system could be used to further improve the final product by incorporating a sulfur reduction method into the process. One method would be to incorporate fixed bed reactors into the process and inject hydrogen to form Hydrogen Sulfide, (H2S), similar to a Hydrodesulfurization, (HDS), unit. The H2S could then be removed by further processing by an amine unit or other process. The desulfurization process occurs at similar temperatures and pressures proposed for the DRU-TAN Reduction Unit, so the value added economics of the reactor modifications and hydrogen injection could be easily evaluated for a given feedstock.

The DRU-TAN Reduction Unit can be used to treat other petroleum products that require diluent addition for pipeline transport. Vacuum Gas Oil, (VGO), is similar to bitumen in that it cannot be transported by pipeline at ambient conditions. VGO could be transported by ambient pipeline with the addition of a diluent, and the DRU-TAN Reduction unit could remove diluent and upgrade the VGO to a higher valued product. If the final destination was a refinery, the heat requirements for the system could be supplied by the refinery, reducing the operating cost.

Figure 6:
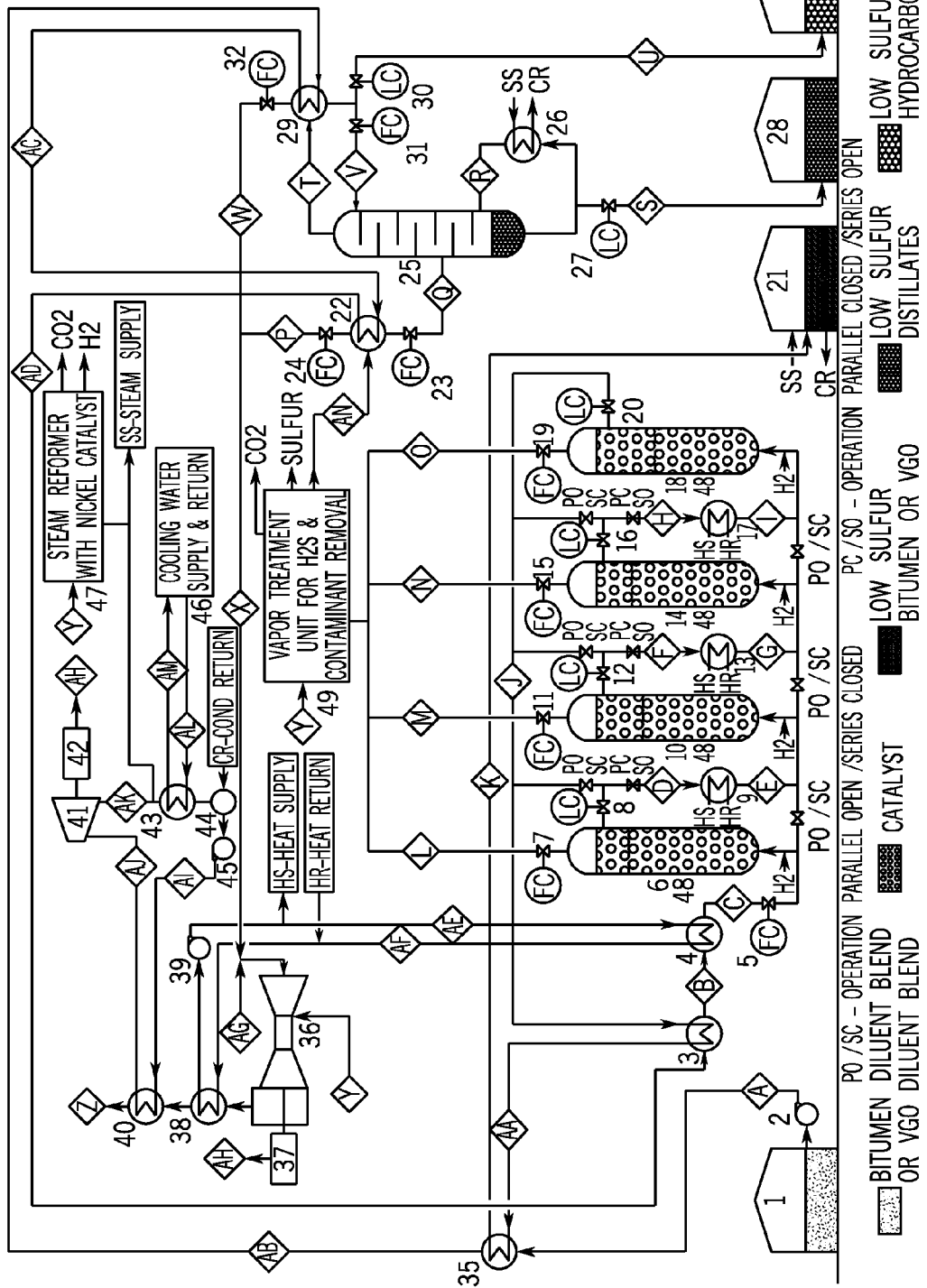
FIG. 6 depicts an embodiment with sulfur removal and recovery.

A system using sulfur recovery is shown in FIG. 6 and at block 130 in FIG. 2. A sulfur removal system is added to the process of FIG. 3 to increase the value of the final products and further improve overall economics. A hydrogen steam reformer with nickel catalyst 47 may be incorporated into the system to provide hydrogen, (H2), to the reactors to remove sulfur and other contaminants. The hydrogen steam reformer 47 is supplied natural gas Y and steam SS and produces Carbon Dioxide, (CO2) and hydrogen, (H2). The reactors may be filled with a catalyst 48 that is optimized for the feedstock and sulfur content. A vapor treatment unit 49 may be added to vapor streams L, M, N and O to remove hydrogen sulfide, (H2S), Carbon Dioxide, (CO2) and other contaminants from the vapor stream. The vapor treatment unit 49 is supplied suitable fuel such as natural gas Y and produces clean vapor AN, Carbon Dioxide, (CO2) and elemental Sulfur.

The resulting sulfur from the vapor treatment unit may be sold to local markets and the CO2 from both the steam reformer and vapor treatment unit could be piped to production fields and used for oil production enhancements. CO2 could also be sequestered as a greenhouse reduction method. The addition of the sulfur reduction system would increase the value of all the products including Bitumen, Light Hydrocarbons and Diluent, while creating additional value added products such as sulfur, CO2 and waste heat.

In one embodiment of the system shown in FIG. 6, the resulting technology may be used on a variety of feedstocks including Vacuum Gas Oil, (VGO), Heavy Crude Oil such as Mayan and other substances requiring Diluent Recovery, TAN Reduction or Sulfur Removal.

References throughout this specification to "one embodiment" or "an embodiment" mean that a particular feature, structure, or characteristic described in connection with the embodiment is included in at least one implementation encompassed within the disclosure herein. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the process has been described with respect to a limited number of embodiments, those skilled in the art will appreciate numerous modifications and variations therefrom. It is intended that the appended claims cover all such modifications and variations as fall within the true spirit and scope of this present invention. Similarly, although it is believed that unassisted thermal decomposition of the naphthenic acids provides in most situations the most efficient and lowest cost solution when combined with the need to remove diluent, it is known from the literature that various catalysts in the presence of auxiliary reactants such as hydrogen can accelerate the process.

What is claimed is:

1. A method for simultaneously recovering diluent from heavy bituminous crude oil and reducing the acidity comprising:
    heating a blend of bituminous crude oil and diluent to degradation of naphthenic acids in the crude oil;
    providing sufficient residence time at elevated temperatures for the decomposition reactions to reduce the acid concentrations to reduce total acid number by at least 75% and to simultaneously remove the diluent; and
    removing diluent by distillation.

2. The method of claim 1 whereby the residence time required for completion of the thermal decomposition reaction of the acids is provided in multiple reactors in series or parallel, arranged such that:
    each reactor's vapor flow is individually controlled to maintain a constant rate over the required residence time;
    both liquid and vapor flow concurrently upwards in the reactor so that as more degradation products are formed, vapor flow is also increasing, while vapor and liquid are separated at the top of each reactor; and
    reheating between the reactors to compensate for the heat required for the vaporization of the light hydrocarbons.

3. The method of claim 1 including using vertical concurrent upward flow for both the bituminous oil blend and the evaporated diluents, and flowing hydrocarbon vapor stream through the liquid, removing decomposition products and driving the reaction to completion.

4. The method of claim 1 including recovering the light hydrocarbons from the vented vapors by cooling and condensing said vapors while venting the non-condensable contaminants and residual hydrocarbon vapors to a vapor destruction device.

5. The method of claim 1 including recovering through distillation from said light hydrocarbons the fractions in the distillate boiling range, that were stripped with the lighter diluents out of the heavy crude oil.

6. The method of claim 1 including removing substantially all of the diluent.

7. The method of claim 1 including recovering heat from treated liquid and vapor streams and using that heat to preheat the blend.

8. The method of claim 1 including generating electricity and heat from suitable fuel and contaminant vapors produced in the course of recovering the diluent.

9. The method of claim 2 including supplying hydrogen to the reactors to convert sulfur compounds to hydrogen sulfide (H2S).

10. The method of claim 9 including removing the H2S by converting H2S to H2O and elemental sulfur.

11. The method of claim 1 including treating petroleum products that require diluent addition for pipeline transport.

* * * * *